US008693144B1

(12) United States Patent
Pan et al.

(10) Patent No.: US 8,693,144 B1
(45) Date of Patent: Apr. 8, 2014

(54) HEAD GIMBAL ASSEMBLIES AND METHODS FOR MEASURING SLIDER PARAMETERS

(71) Applicant: Western Digital Technologies, Inc., Irvine, CA (US)

(72) Inventors: Tzong-Shii Pan, San Jose, CA (US); Yi Lu, San Jose, CA (US); Yanning Liu, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/906,205

(22) Filed: May 30, 2013

Related U.S. Application Data

(60) Provisional application No. 61/787,859, filed on Mar. 15, 2013.

(51) Int. Cl.
G11B 21/02 (2006.01)
(52) U.S. Cl.
USPC ........................................ 360/245.2
(58) Field of Classification Search
USPC ........................................ 360/245.2
See application file for complete search history.

(56) References Cited

U.S. PATENT DOCUMENTS

| 5,875,071 | A |  | 2/1999 | Erpelding et al. |
| 5,949,546 | A |  | 9/1999 | Lee et al. |
| 5,995,335 | A | * | 11/1999 | Jurgenson et al. ......... 360/244.8 |
| 6,404,504 | B2 | * | 6/2002 | Liu et al. ....................... 356/507 |
| 6,552,875 | B1 |  | 4/2003 | Le et al. |
| 6,785,081 | B2 | * | 8/2004 | Chapin et al. ................... 360/75 |
| 6,992,862 | B2 |  | 1/2006 | Childers et al. |
| 7,034,372 | B1 |  | 4/2006 | Kulangara et al. |
| 7,692,888 | B2 |  | 4/2010 | Duan et al. |
| 7,724,462 | B2 | * | 5/2010 | Duan et al. ..................... 360/75 |
| 8,456,643 | B2 | * | 6/2013 | Prabhakaran et al. ........ 356/507 |
| 2001/0014075 | A1 |  | 8/2001 | Budde |
| 2004/0240099 | A1 | * | 12/2004 | Brannon et al. ................ 360/75 |
| 2005/0099730 | A1 |  | 5/2005 | Motonishi et al. |
| 2005/0165561 | A1 |  | 7/2005 | Zeng |
| 2007/0115591 | A1 |  | 5/2007 | Yao et al. |
| 2008/0080086 | A1 |  | 4/2008 | Che et al. |
| 2008/0170316 | A1 |  | 7/2008 | Kim |
| 2009/0073611 | A1 |  | 3/2009 | Wei et al. |
| 2011/0286129 | A1 |  | 11/2011 | Prabhakaran et al. |

* cited by examiner

Primary Examiner — Mark Blouin

(57) ABSTRACT

A head gimbal assembly (HGA) for a disk drive is disclosed. The HGA includes a load beam, a flexure, and a slider attached to the load beam by the flexure. The load beam comprises one or more apertures configured to pass a laser beam at each of at least three non collinear points to measure at least one slider parameter. The method for measuring at least one slider parameter includes positioning the slider over a rotating medium and projecting a laser beam through the one or more apertures in the load beam.

20 Claims, 8 Drawing Sheets

HEAD GIMBAL ASSEMBLIES AND METHODS FOR MEASURING SLIDER PARAMETERS

CROSS-REFERENCE TO RELATED APPLICATION

This application claims the benefit of U.S. Provisional Application Ser. No. 61/787,859, filed on Mar. 15, 2013, which is expressly incorporated by reference herein in its entirety.

BACKGROUND

The present disclosure relates generally to drive disks, and more particularly, to head gimbal assemblies and methods for measuring slider parameters.

Disk drives are used to store and retrieve data in many electronic devices including computers, televisions, video recorders, servers, digital recorders, etc. A typical disk drive includes a head having a slider and a transducer with read and write elements in close proximity to the surface of a rotatable magnetic disk. As the magnetic disk rotates beneath the head, a thin air bearing is formed between the surface of the magnetic disk and an air bearing surface (ABS) of the slider. The read and write elements of the head are alternatively used to read and write data while a positioner arm positions the head along tracks on the magnetic disk. The tracks on the magnetic disks are typically concentric circular regions onto which data can be stored by writing to it and retrieved by reading from it.

A suspension assembly connects the slider to the positioner arm. The suspension assembly includes a load beam and a flexure which allows the slider to gimbal with respect to the load beam. The load beam and the flexure are fabricated separately and then joined together. The head is then joined to the flexure. The joined assembly comprising the load beam, the flexure and the head is known as a head gimbal assembly (HGA). The HGA supports the slider at the correct height above the rotating disk and allows the slider to pitch and roll so that it can follow the topology of the rotating disk.

The position of the slider with respect to the rotating disk can have a direct impact on performance. Preferably, the slider should be configured to fly as close to the disk as possible without coming into contact with the disk. The closer the slider can fly over the disk, the more densely the data can be stored due to an increase in the magnetic field. However, if the disk comes into contact with the disk, damage may occur to both the transducer and the disk, along with the information stored on the disk. In order to achieve the appropriate position, the HGA is typically designed to balance the load applied to the slider against the upward lift of the air stream below the slider. The HGA is typically designed so that the slider can adjust quickly to surface undulations of the disk with pitch and roll reduced to acceptable levels.

Various methods exist for determining slider motion for test, design, and failure analysis. One method involves projecting a laser beam onto the ABS of the slider from under a transparent glass disk. However, since the glass disk is not the same as the magnetic disk used in disk drives, the interference between the head and the disk may be different. Also, measuring slider motion through a transparent disk requires special experimental setup but still cannot perfectly duplicate the drive operating conditions when the slider is flying over a magnetic disk.

Therefore, what is needed is a system and method to measure slider motion under actual operating conditions without a transparent disk.

SUMMARY

Several aspects of the present invention will be described more fully hereinafter with reference to various embodiments of apparatuses and methods related to head gimbal assemblies and methods for measuring slider parameters.

One aspect of a head gimbal assembly (HGA) for a disk drive is disclosed. The HGA includes a load beam, a flexure, and a slider attached to the load beam by the flexure, wherein the load beam comprises one or more apertures configured to pass a laser beam at each of at least three non collinear points to measure at least one slider parameter.

One aspect of a method for measuring at least one slider parameter in a head gimbal assembly (HGA) for a disk drive is disclosed. The HGA includes a load beam, a flexure, and a slider attached to the load beam by the flexure. The method includes positioning the slider over a rotating medium, and projecting a laser beam through one or more apertures in the load beam to measure said at least one slider parameter.

It will be understood that other aspects of the present invention will become readily apparent to those skilled in the art from the following detailed description, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
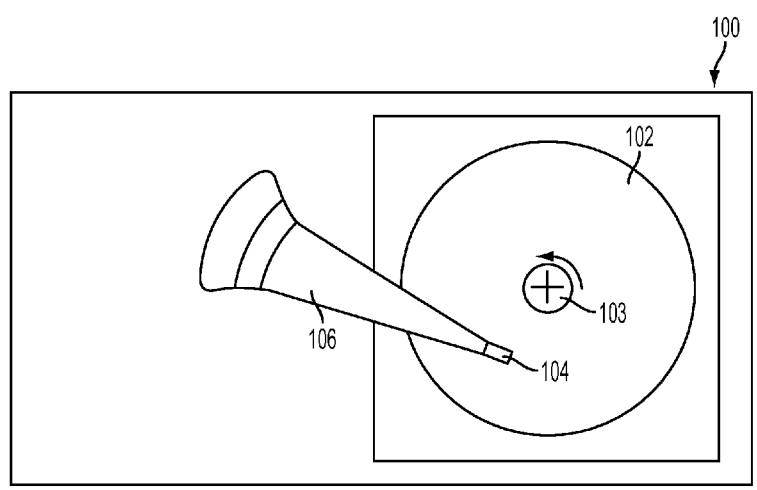
FIG. 1 is a conceptual plan view illustrating an example of a disk drive.

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference to certain shapes and geometries, such as, by way of example, the shape and size of various apertures in the load beam of an HGA. Any reference to a component or aperture having a particular shape or geometry, however, should not be construed as limited to the precise shape illustrated or described, but shall include deviations that result, for example, from manufacturing techniques and/or tolerances. By way of example, an aperture in a load beam may be illustrated or described as round, but in practice may elliptical due to manufacturing techniques and/or tolerances. Accordingly, the components and apertures illustrated in the drawings are schematic in nature and their shapes are not intended to illustrate the precise shape of the component and aperture, and therefore, not intended to limit the scope of the present invention.

When describing various portions of components, such as, by way of example, the location of certain apertures in the load beam of an HGA, relative terms (e.g., bottom, upper, above, below, etc.) may be used to illustrate the relationship of one portion of the component to another portion of the component in the description and drawings. It will be understood that relative terms are intended to encompass different orientations of an apparatus in addition to the orientation shown in the drawings. By way of example, if an apparatus in the drawings is turned over, portions of a component described as being on the "bottom" would then be oriented on the "top" and portions described as being on the "top" would then be oriented on the "bottom." Thus, relative terms used to describe the orientation of components are provided solely for illustrative purposes and are not intended to limit the invention in any way.

In the following detailed description, various aspects of the present invention will be presented in the context of a head gimbal assembly (HGA) for a disk drive and methods for measuring slider parameters. While these inventive aspects may be well suited for this application, those skilled in the art will realize that such aspects may be extended to other applications. Accordingly, any reference to an HGA or method for measuring slider parameters is intended only to illustrate the various aspects of the present invention, with the understanding that such aspects may have a wide range of applications FIG. 1 is a conceptual plan view illustrating an example of a disk drive. The disk drive 100 is shown with a rotatable magnetic disk 102. The magnetic disk 102 may be rotated on a spindle 103 by a disk drive motor (not shown) located under the magnetic disk 102. A head 104 may be used to read and write information by detecting and modifying the magnetic polarization of the recording layer on the disk's surface. The head 104 generally includes a slider which is integrally formed with a transducer. The transducer includes read and write elements. The function of the slider is to support the head 104 and any electrical connections between the head 104 and the rest of the disk drive 100. The head 104 is mounted to a positioner arm 106 by a suspension assembly (not shown). The positioned arm 106 may be used to move the head 104 on an arc across the rotating magnetic disk 102, thereby allowing the head 104 to access the entire surface of the magnetic disk 102. As will be described in greater detail later, the suspension assembly includes a load beam and a flexure. The flexure allows the slider to gimbal with respect to the load beam. The head together with the suspension assembly (i.e., the load beam and flexure) is often referred to as a head gimbal assembly (HGA).

Figure 2:
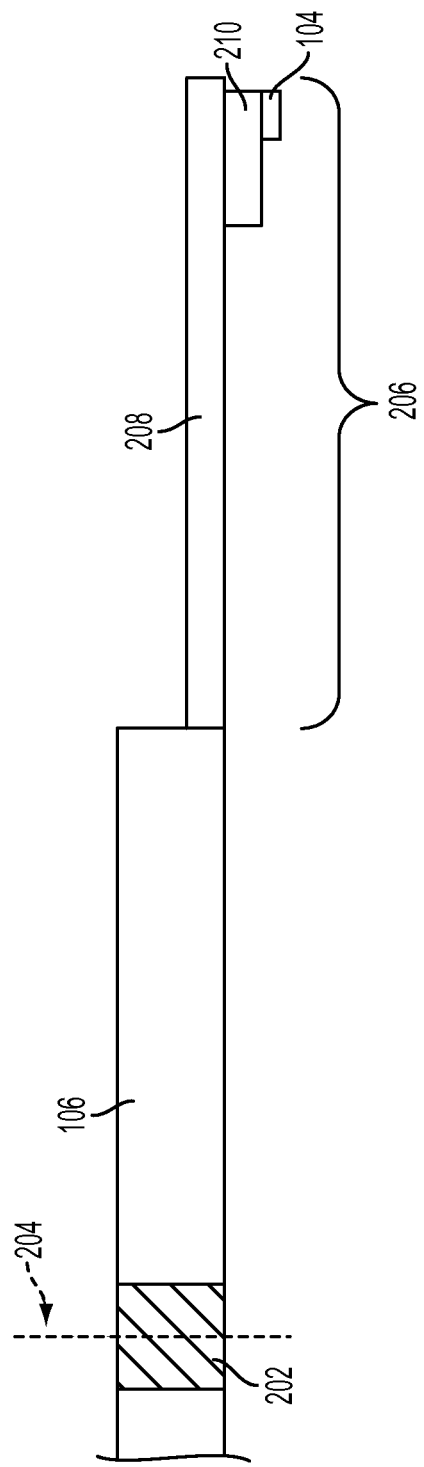
FIG. 2 is a cross-section view illustrating an example of a positioner arm and HGA.

FIG. 2 is a cross-section view illustrating an example of a positioner arm and HGA. The positioner arm 106 includes an aperture 202. The aperture 202 is located at the proximal end of the positioner arm 106 and is coupled for pivotal movement about the axis 204 by an actuator (not shown). An HGA 206 is supported at the distal end of the positioner arm 106. The HGA 206 includes a load beam 208 having a proximal end coupled to the positioner arm 106 and a distal end supporting the head 104. The head 104, or more specifically, the slider is attached to the load beam 208 by a flexure 210. The flexure 210 allows the slider to gimbal with respect to the load beam 208 as the slider flies over the surface of the rotating magnetic disk below.

Figure 3A:
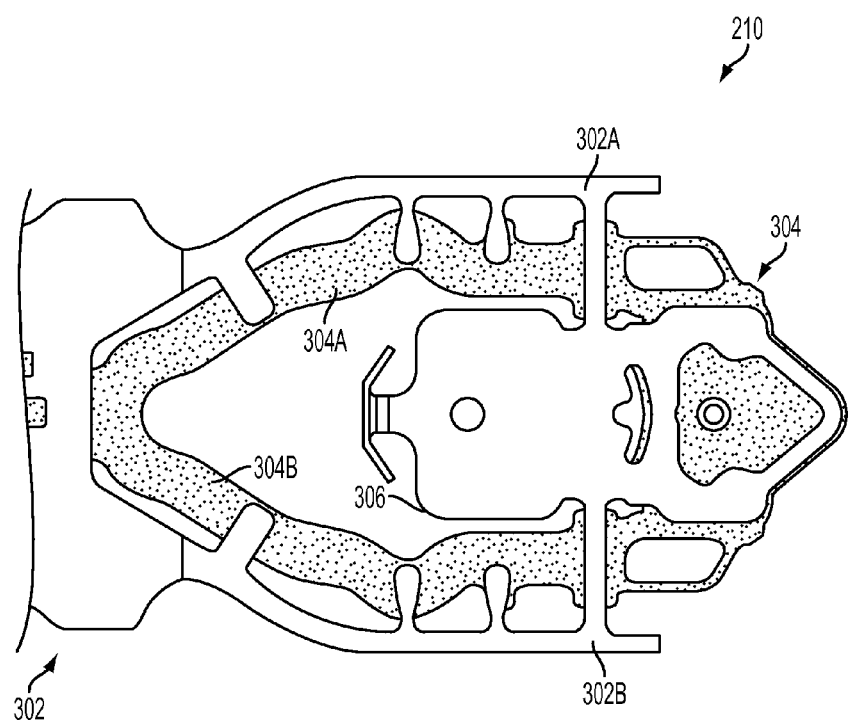
FIG. 3A is a plan view illustrating an example of a suspension assembly for an HGA.
Figure 3B:
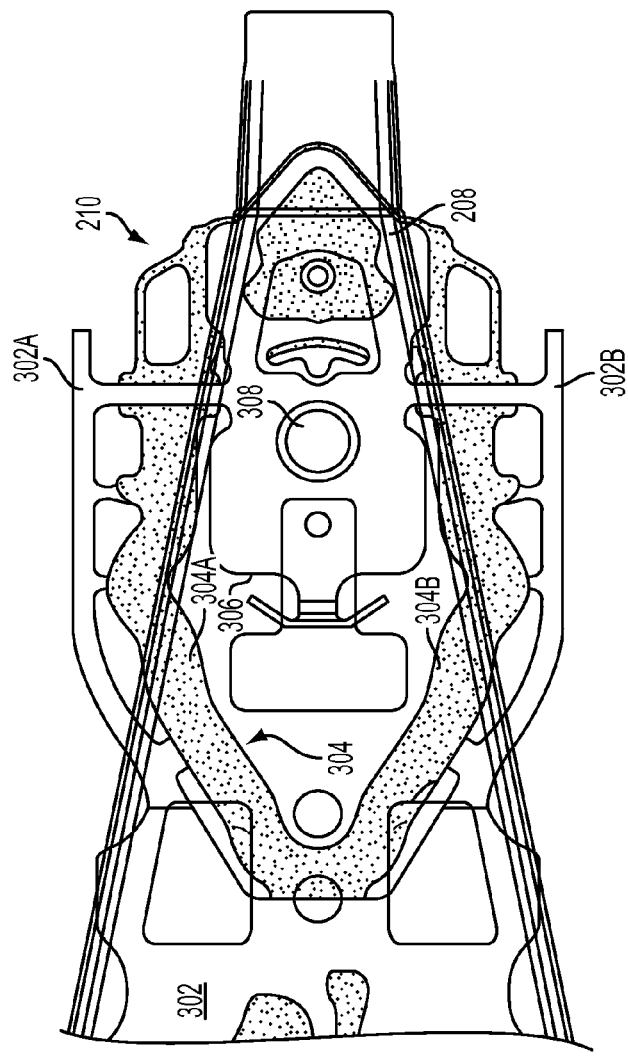
FIG. 3B is a plan view illustrating an example of the flexure for the suspension assembly.

FIG. 3A is a plan view illustrating an example of a suspension assembly for an HGA and FIG. 3B is a plan view illustrating an example of the flexure for the suspension assembly. Referring to FIG. 3B, the flexure 210 includes a support 302 having a left outrigger 302A and a right outrigger 302B. The flexure 210 also includes a flexible circuit assembly 304 that splits up into a left electrical trace 304A and a right electrical trace 304B. The left electrical trace 304A follows the path of the left outrigger 302A and is tethered to the left outrigger 302A. Similarly, the right electrical trace 304B follows the path of the right outrigger 302B and is tethered to the right outrigger 302B. The flexure 210 also includes a tongue 306 that is connected to the left and right outriggers 302A and 302B. In this example, the slider may be attached to the bottom surface of the tongue 306 with a non-conductive adhesive that may be cured using ultraviolet (UV) light. As shown in FIG. 3A, the load beam 208 is attached to the upper surface of the flexure 210. The load beam 208 may be spot welded to the support 302 or attached in some other suitable manner. The load beam 208 may include a gimbal dimple 308 which provides the axis of rotation for the slider. Specifically, the HGA 206 in this example is configured such that the slider can pitch and roll with respect to the gimbal dimple 308.

The load beam may include one or more apertures. The one or more apertures may be used to measure one or more slider parameters including, in at least one embodiment, servo control and firmware parameters. By way of example, slider motion may be measured by projecting a laser beam through the one or more apertures in the load beam onto the flexure tongue. The apertures may be substantially round, or any other suitable shapes. "Substantially round" means that the aperture may be round or may deviate from a round aperture in accordance with manufacturing processes and/or tolerances. By way of example, a substantially round aperture may be elliptical. The one or more apertures should be small enough not to affect the dynamics of the HGA, yet larger than the laser spot size to reduce laser scattering effects. Preferably, the one or more apertures should be positioned such that the laser beam can go through the load beam and be focused on the bonding area between the flexure and the slider where the non-conductive adhesive is applied. The bonding between flexure and the slider can be assumed perfect within the area where non-conductive adhesive is applied, so the measurement will be accurate. Those skilled in the art will be well suited to determine the appropriate shape, size and location of the one or more apertures in the load beam based on a number of factors including the location of the non-conductive adhesive applied by different manufacturers as well as the particular application and the slider parameters being considered.

Figure 4:
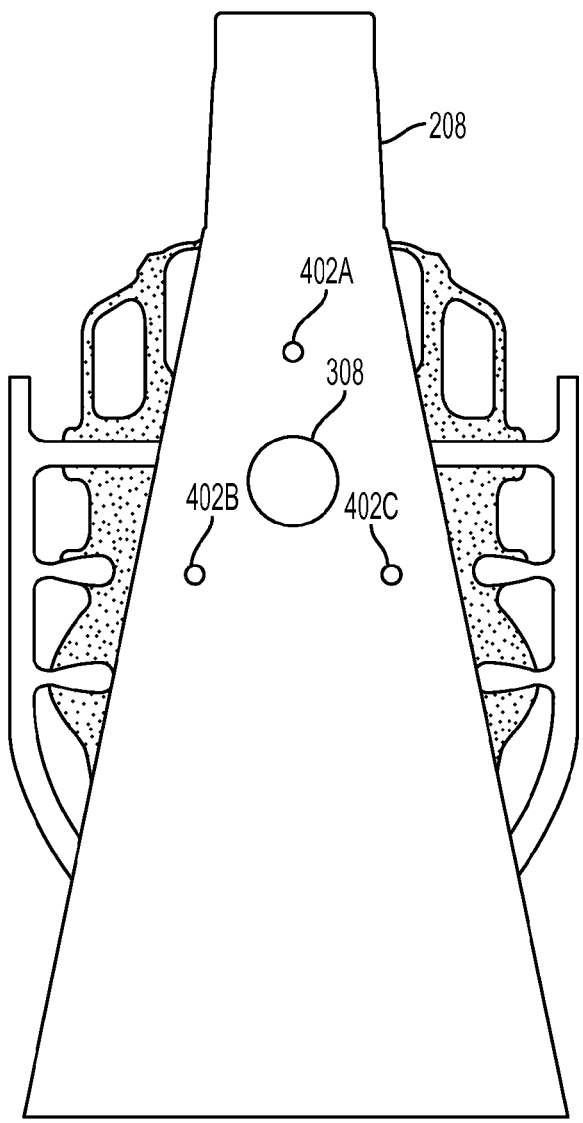
FIG. 4 is a plan view illustrating an example of a suspension assembly having three non collinear apertures located in the load beam.

FIG. 4 is a plan view illustrating an example of a suspension assembly having three non collinear apertures 402A-402C located in the load beam 208. In this example, the three apertures 402A-402C are arranged at vertices of a triangle surrounding the gimbal dimple 308. Specifically, one aperture 402A is located forward of the gimbal dimple 308 along the central elongated axis of the load beam 208 and the other two apertures 402B and 402C are located to the rear of the gimbal dimple 308 adjacent opposite edges of the load beam 208. Alternatively, one aperture may be located to the rear of the gimbal dimple 308 along the central elongated axis of the load beam and the other two apertures may be located forward of the gimbal dimple 308 adjacent opposite edges of the load beam. Either way, all major slider modes may be captured. By way of example, roll motion may be captured by measuring relative displacement, velocity, and/or acceleration motion between the flexure tongue areas exposed through the apertures 402B and 402C. Similarly, pitch motion may be captured by measuring relative displacement, velocity, and/or acceleration motion between an average of the measurements through apertures 402B and 402C versus the measurement through aperture 402A.

Figure 5:
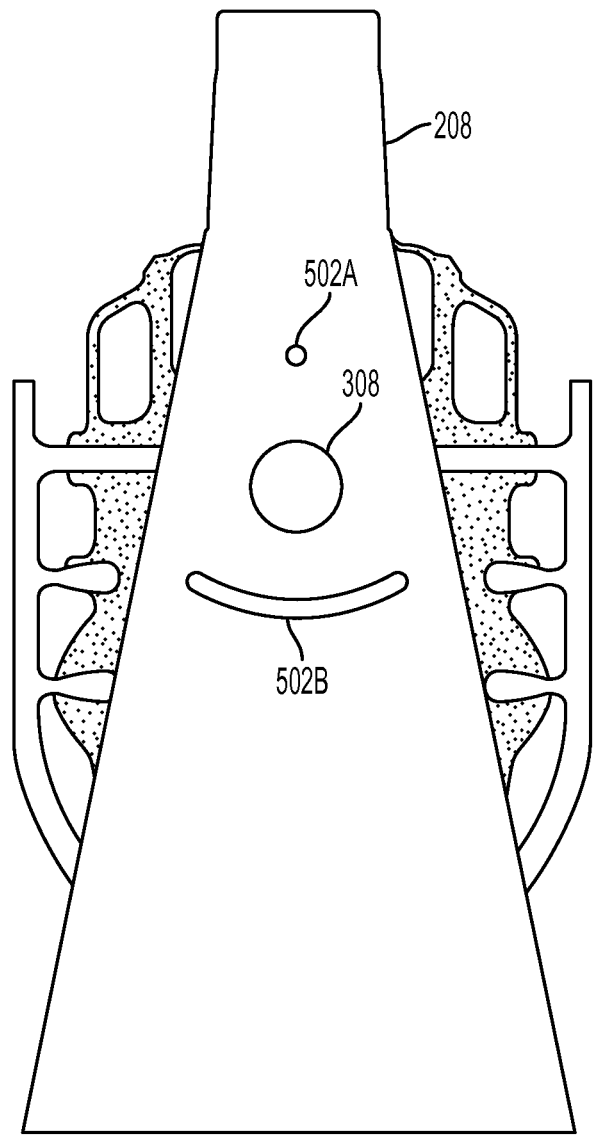
FIG. 5 is a plan view illustrating an example of a suspension assembly having a substantially round aperture and an arcuate slot.

In an alternative embodiment of an HGA, the load beam 208 may be designed with two apertures: a round aperture and a slot. FIG. 5 is a plan view illustrating an example of a suspension assembly having a substantially round aperture 502A located forward of the gimbal dimple 308 along the central elongated axis of the load beam 208, and an arcuate slot 502B located to the rear of the gimbal dimple 308 and extending between the two edges of the load beam 208. Alternatively, the substantially round aperture may be located to the rear of the gimbal dimple 308 along the central elongated axis of the load beam 208, and the arcuate slot located forward of the gimbal dimple 308 and extending between the two edges of the load beam 208. As explained above, either configuration allows for all major slider modes to be captured by providing a means for a laser beam to be projected through the load beam 208 onto the flexure 210 at three non collinear points comprising the vertices of a triangle surround the gimbal dimple 308.

Figure 6:
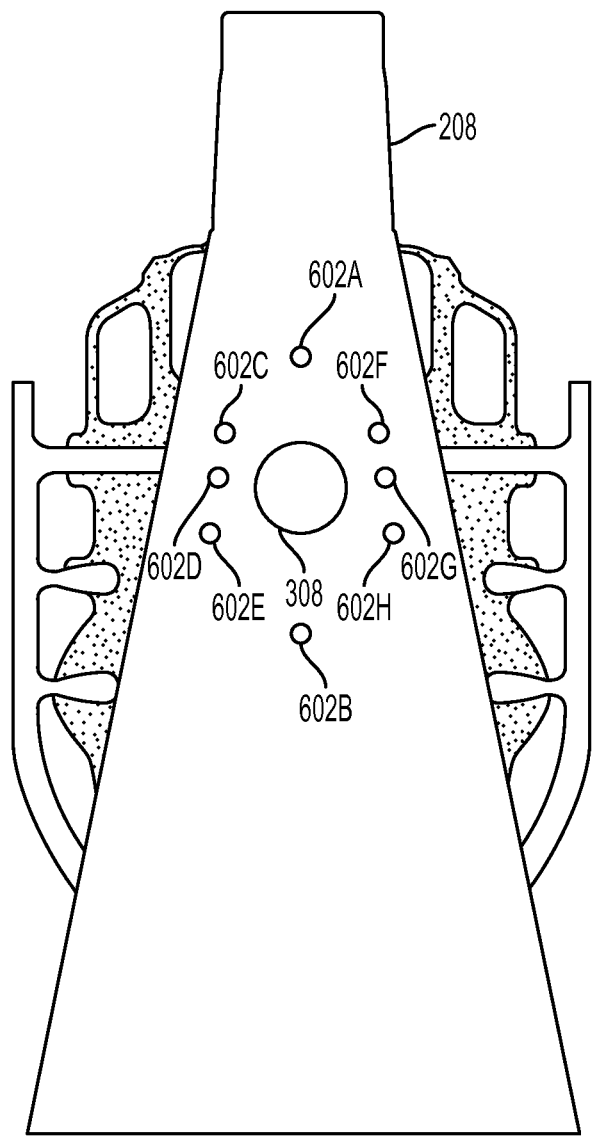
FIG. 6 is a plan view illustrating an example of a suspension assembly having eight non collinear apertures in the load beam.

A further embodiment of an HGA may include a load beam with additional apertures. FIG. 6 is a plan view illustrating an example of a suspension assembly having eight non collinear apertures 402A-402H in the load beam 208. In this embodiment, two apertures are located along the central elongated axis of the load beam: one aperture 602A located forward of the gimbal dimple 308 and one aperture 602B located to the rear of the gimbal dimple 308. Three apertures 602C-602E are located along one edge of the load beam 208 and three apertures 602F-602H are located along the other edge of the load beam 208. Similar to the load beam configurations presented earlier, the roll motion may be captured by measuring relative displacement, velocity, and/or acceleration motion between one or more of the apertures 602C-602E located along one edge of the load beam 208 and one or more apertures 602F-602H located along the other edge of the load beam 208. In one embodiment, the roll motion may be captured by taking an average of the roll motion measured between each pair of apertures along opposite edges of the load beam, i.e.; between the aperture pairs 602C and 602 F; 602D and 602G; 602E and 602H. In another embodiment, the measurements made through apertures 602C-602E may be averaged, the measurements made through apertures 602F-602H may be averaged, and the roll motion determined from the comparison of the two averages. The pitch motion may be captured by measuring relative displacement, velocity, and/or acceleration between the two apertures 602A and 602B located along the central elongated axis of the load beam 208. This measurement may be supplemented by measuring anyone of the same metrics with respect to some or all of the apertures extending along an elongated edge axis of the load beam 208 with respect to each other. For example, in one embodiment, the average of measurements taken between apertures 602C and 602F may be compared to the average of measurements taken between apertures 602E and 602H to determine roll motion. One of ordinary skill in the art will recognize that there are several suitable combinations of apertures for averaging and comparing measurements to determine pitch.

Figure 7:
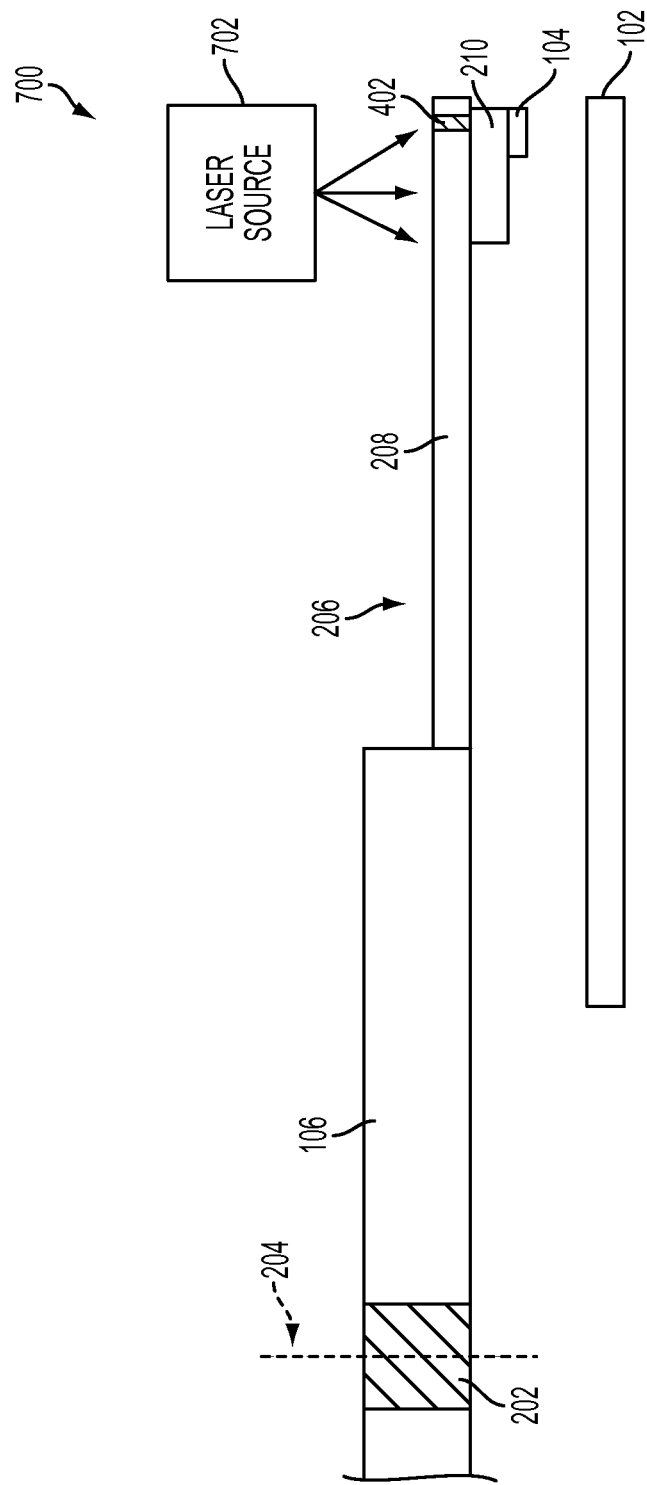
FIG. 7 is a conceptual cross-section view illustrating an example of a system for measuring a slider parameter, such as slider motion, in an HGA for a disk drive.

FIG. 7 is a conceptual cross-section view illustrating an example of a system for measuring a slider parameter, such as slider motion, in an HGA for a disk drive. As shown in FIG. 7, the system 700 comprises a laser source 702 positioned above the disk drive. The disk drive is shown with a positioner arm 106 supporting an HGA 206 over a rotating magnetic disk 102. The HGA 206 includes a load beam 208 coupled to the distal end of the positioner arm 106 and a head 104, or more specifically a slider, coupled to the load beam 208 by a flexure 210. The load beam 208 may include one or more apertures positioned to expose one or more bonding areas between the flexure 210 and the slider where the non-conductive adhesive is applied. In this example, the load beam 208 includes three apertures, one of which is viewable in this particular cross section view. The laser source 702 may be used to project a laser beam through the load beam apertures 402 and process the scattered beam from the flexure 210 using a phase-shift method, time-of-flight method, or any other suitable method. By way of example, the laser source 702 may be a Doppler vibrometer (LDV). An LDV is an instrument that measures the frequency or phase difference between an internal reference beam and the scattered beam to determine the Doppler shift. The velocity of the flexure 210 in the direction of the laser can then be computed from the Doppler shift. As explained above, the load beam apertures 402 should be larger than the laser spot size to reduce laser scattering effects, typically 0.15 mm when using the LDV system. However, as those skilled in the art will readily appreciate, the laser spot size also depends on the focus distance, and therefore, may vary depending on the particular application.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A head gimbal assembly (HSA) for a disk drive, comprising:
   a load beam;
   a flexure; and
   a slider attached to the load beam by the flexure;
   wherein the load beam comprises one or more apertures configured to pass a laser beam at each of at least three non collinear points to measure at least one slider parameter.

2. The suspension assembly of claim 1 wherein said at least one slider parameter comprises at least one of displacement, velocity, and acceleration of the slider with respect to a rotating medium.

3. The suspension assembly of claim 1 wherein the load beam further comprises a gimbal dimple, and wherein three of said at least three non collinear points are arranged at vertices a triangle surrounding the gimbal dimple.

4. The suspension assembly of claim 1 wherein the one or more apertures comprises at least three non collinear apertures.

5. The suspension assembly of claim 4 wherein each of the three or more non collinear apertures is substantially round.

6. The suspension assembly of claim 4 wherein the load beam further comprises a gimbal dimple, and wherein three of said at least three non collinear apertures are arranged at vertices a triangle surrounding the gimbal dimple.

7. The suspension assembly of claim 1 wherein the one or more apertures comprises a substantially round aperture and a slot.

8. The suspension assembly of claim 7 wherein the load beam further comprises a gimbal dimple, and wherein the substantially round aperture and two ends of the slot are arranged at vertices of a triangle surrounding the gimbal dimple.

9. The suspension assembly of claim 1 wherein the slider is attached to the flexure by adhesive applied to at least one bonding area between the slider and the flexure, and wherein the one or more apertures are arranged such that the laser beam can be focused on one or more of said at least one bonding area.

10. A method of measuring at least one slider parameter in a head gimbal assembly (HGA) for a disk drive, wherein the HGA comprises a load beam, a flexure, and a slider attached to the load beam by the flexure, the method comprising:
    positioning the slider over a rotating medium; and
    projecting a laser beam through one or more apertures in the load beam to measure said at least one slider parameter.

11. The method of claim 10 wherein said at least one slider parameter comprises at least one of displacement, velocity, and acceleration of the slider with respect to the rotating medium.

12. The method of claim 10 wherein the laser beam is projected using a laser Doppler vibrometer.

13. The method of claim 9 wherein the laser beam is projected through the one or more apertures in the load beam at each of at least three non collinear points.

14. The method of claim 13 wherein the load beam further comprises a gimbal dimple, and wherein three of said at least three non collinear points are arranged at vertices of a triangle surrounding the gimbal dimple.

15. The method of claim 10 wherein the one or more apertures comprises at least three non collinear apertures.

16. The method of claim 15 wherein each of said at least three non collinear apertures is substantially round.

17. The method of claim 16 wherein the load beam further comprises a gimbal dimple, and wherein three of said at least three non collinear points are arranged at vertices a triangle surrounding the gimbal dimple.

18. The method of claim 10 wherein the one or more apertures comprises a substantially round aperture and a slot.

19. The method of claim 18 wherein the load beam further comprises a gimbal dimple, and wherein the substantially round aperture and two ends of the slot are arranged at vertices of a triangle surrounding the gimbal dimple.

20. The method of claim 10 wherein the slider is attached to the flexure by adhesive applied to a bonding area between the slider and the flexure, and wherein the projection of the laser beam through the one or more apertures of the load beam comprises focusing the laser beam on the bonding area.

* * * * *